(12) United States Patent
Fitton et al.

(10) Patent No.: US 7,330,505 B2
(45) Date of Patent: Feb. 12, 2008

(54) EQUALISER APPARATUS AND METHODS (75) Inventors: Michael Philip Fitton, Bristol (GB);
Siew Chung Leong, Bristol (GB);
Douglas John Gargin, Bristol (GB);
Rafael Arcangel Cepeda Lopez,
Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 628 days.

(21) Appl. No.: 10/641,154

(22) Filed: Aug. 15, 2003

(65) Prior Publication Data

US 2004/0101072 A1 May 27, 2004

(30) Foreign Application Priority Data

Aug. 16, 2002 (GB) .................................. 0219172.4

(51) Int. Cl.
*H03K 5/159* (2006.01)
(52) U.S. Cl. ..................................................... 375/229
(58) Field of Classification Search ................ 375/341, 375/350, 229, 230, 231, 232, 233, 234, 235, 375/236; 333/18, 28; 708/300, 322, 323; 379/340, 398
See application file for complete search history.

(56) References Cited

U.S. PATENT DOCUMENTS

| | | | |
|---|---|---|---|
| 5,268,930 A | 12/1993 | Sendyk et al. | |
| 5,319,674 A | 6/1994 | Cherubini | |
| 5,343,335 A | 8/1994 | Hara | |
| 5,353,307 A * | 10/1994 | Lester et al. ................. | 375/233 |
| 5,432,821 A * | 7/1995 | Polydoros et al. .......... | 375/340 |
| 5,471,501 A | 11/1995 | Parr et al. | |
| 5,499,272 A * | 3/1996 | Bottomley .................. | 375/347 |
| 5,594,941 A * | 1/1997 | Dent .......................... | 455/13.4 |

(Continued)

FOREIGN PATENT DOCUMENTS

EP     0 804 007 A2     10/1997

(Continued)

OTHER PUBLICATIONS

V. Mignone, et al., "CD3-OFDM: A New Channel Estimation Method to Improve the Spectrum Efficiency in Digital Terrestrial Television Systems". International Broadcasting Convention, XP-000617513, No. 413, Sep. 14, 1995, pp. 122-128.

*Primary Examiner*—Sam K. Ahn
(74) *Attorney, Agent, or Firm*—Oblon, Spivak, McClelland, Maier & Neustadt, P.C.

(57) ABSTRACT

An equalizer for a digital communications system includes a first buffer to store received data prior to equalisation; a second buffer to store error-checked received data; a channel estimator coupled to the first and second buffers to determine a channel estimate using the received data from the first buffer and the error-checked data from the second buffer; and a control unit coupled to the channel estimator to update a channel estimate for use by the equalizer in equalizing the received data. The control unit performs the updating conditional upon a difference between the channel estimate and a previous channel estimate used for equalizing the received data. A look-up table is coupled to the control unit and a calculating device is coupled to the look-up table to calculate and store, in the look-up table, data obtained by applying the channel estimate to a sequence of symbols.

15 Claims, 5 Drawing Sheets

U.S. PATENT DOCUMENTS

| | | |
|---|---|---|
| 5,596,607 A | 1/1997 | Larsson et al. |
| 5,862,156 A | 1/1999 | Huszar et al. |
| 6,356,586 B1 | 3/2002 | Krishanamoorthy et al. |
| 2001/0001008 A1* | 5/2001 | Dent .......................... 375/271 |
| 2003/0099308 A1* | 5/2003 | Cao et al. ................... 375/340 |

FOREIGN PATENT DOCUMENTS

| | | |
|---|---|---|
| EP | 0 881 796 | 12/1998 |
| EP | 0 966 113 A1 | 12/1999 |
| WO | WO 00/02326 | 1/2000 |
| WO | WO 00/10299 | 2/2000 |
| WO | WO 00/44141 | 7/2000 |
| WO | WO 01/39531 | 5/2001 |
| WO | WO 01/45296 | 6/2001 |

* cited by examiner

EQUALISER APPARATUS AND METHODS

FIELD OF THE INVENTION

This invention is generally concerned with equalisation in digital communications systems, and more particularly with improved methods and apparatus for MLSE (Maximum Likelihood Sequence Estimation) equalisation.

BACKGROUND OF THE INVENTION

MLSE equalisation is a well-known technique described, for example, in J. G. Proakis, "Digital Communications", McGraw Hill, 3/e 1995. The technique is described in detail below but, broadly speaking, an estimate is made of a sequence of symbols representing binary bits by hypothesising received symbol sequences, applying to the hypothesised sequences a channel estimate for a channel over which data has been transmitted, and comparing the result with the received data to see which estimated hypothesised sequence is the closest match. Typically the best match is found by determining the minimum mean-square error (MMSE), although other metrics may also be employed, and generally the procedure is implemented using a variant of the Viterbi algorithm.

The channel estimate comprises a set of numbers which models the transmission channel, for example comprising a complex number representing a magnitude and phase of the channel response at a particular delay. The channel response may be determined at delays of integer multiples of the symbol period, in effect defining a set of multipath components. Generally the channel response decreases at longer delays and it becomes zero after the longest multipath delay. In a digital system there may be more than one sample per symbol and, in this case, the channel response may be defined at a finer time resolution. All this is well known to the skilled person.

As the symbol period becomes significant compared to the time dispersion of the wireless channel Inter-Symbol Interference (ISI) degrades the performance of a receiver for data transmitted through the channel. The Maximum Likelihood metric provides optimal reception of data with ISI but is relatively complex to implement. However where the time dispersion is relatively small, so that there are relatively few multipath components to consider at symbol-spaced delays, the quantities of data to be processed are reduced. This is the case, for example, with short range radio links such as high rate Bluetooth (Trade Mark) links. Aspects of the invention will therefore be described with reference to the High Rate Bluetooth link specification, although it should be understood that applications of the invention are not limited to this type of link.

The Bluetooth group of standards is concerned with short range (up to around 10 meters) rf transmission as a replacement for cables. The basic standard provides a frequency hopping spread spectrum (FHSS) link operating at 0.7 Mbps (V 1.1) or 2.1 Mbps (V 1.2). High rate Bluetooth has a maximum user bit rate of 11.4 Mbps and is associated with the IEEE 802.15 group of standards, in particular IEEE 802.15.3.

The performance of a digital rf link can be improved by using coherent or pseudo-coherent detection and by employing multiple antennas and/or equalisation. Maximum likelihood sequence estimation is one form of non-linear equalisation which, conventionally, uses a predefined training sequence of bits, known at the receiver, to derive an estimate of the channel response. Such channel estimation is conventionally performed every time a new packet is received. MLSE-type equalisers provide good performance as long as an accurate estimate of the channel can be derived at the receiver. One of the aims of the invention is to provide improved methods and apparatus for channel estimation during the equalisation process.

Optimum channel estimation generally requires long training sequences and waste transmission bandwidth. Conventionally, once the transmission channel has been estimated the system does not track variations in the channel while receiving a packet so that for a subsequent packet an equally long training sequence is required, whether or not the channel estimate has in practice changed.

U.S. Pat. No. 6,275,525 describes an MLSE technique in which an initial channel estimation provides the information needed to perform the MLSE, and in which the channel estimate is then updated based upon tentative, adaptive decisions made on the received data. This improves upon the basic MLSE technique, but introduces a delay and leaves room for further improvement in the channel estimation procedure.

U.S. Pat. No. 6,373,888 describes a technique in which a plurality of channel estimates is generated from a training sequence by using a plurality of (channel) filter models, selecting models with different numbers and positions of taps. The model with the best fit to the training data, that is the least residual error, is then used for decoding according to the Viterbi algorithm.

WO 00/44141 describes an MLSE technique in which look-up tables are constructed by pre-computing complex hypothesised received symbol values (or sample values) by operating on hypothesised transmitted symbols with channel tap estimates. This is specifically described at page 8 line 11 to page 9 line 23 (with reference to FIG. 7) and page 12 line 3 to page 13 line 2 (with reference to FIGS. 8-11) of WO 00/44141, which specific extracts from '141 are hereby incorporated by reference.

The present invention addresses, among other things, the problem of providing more frequent and accurate channel estimations and, more particularly, the problem of tracking the channel variation.

SUMMARY OF THE INVENTION

According to a first aspect of the present invention there is therefore provided an equaliser for a digital communications system, the equaliser comprising a first buffer to store received data prior to equalisation; a second buffer to store error-checked received data; a channel estimator coupled to said first and second buffers to determine a channel estimate using said received data from said first buffer and said error-checked data from said second buffer; and a control unit coupled to said channel estimator to update a channel estimate for use by said equaliser in equalising said received data.

Using error-checked and/or corrected received data for the channel estimation allows variations in the channel estimate to be tracked and the estimate to be updated when necessary, even during the reception of data as opposed to a training sequence. The channel estimate can also be used to update or upgrade estimated received data, for example with the aim of re-equalising data which, after equalisation, was determined by an error-detection technique to be erroneous. The equaliser takes advantage of the use of error-detection and/or correction techniques in the transmitted (and received) data, and in particular the inclusion of sufficient information within the received data to allow the equaliser to determine whether at least a portion of the received data was received and demodulated correctly. Embodiments of this invention work particularly well when such error detection and/or correction information is distributed at intervals within or along transmitted (and received) packets of data.

Preferred embodiments of the equaliser also include one or more path metric evaluating modules coupled to the control unit for receiving and evaluating estimated or hypothesised paths using the received data prior to equalisation, and a comparator to select an estimated or hypothesised path for providing an output from the equaliser. The selected path is preferably the path which, according to the selected metric, is closest to or most likely to represent the received data. The equaliser may further include a memory to store one or more symbols of a selected path for output, and preferably for use by the control unit and/or channel estimator for generating the estimated or hypothesised data sequences.

Channel coefficients determined at different times can often be relatively similar. A comparison between a newly calculated set of channel coefficients and a presently used set of coefficients (or, equivalently, between a newly calculated channel estimate and a presently or previously used channel estimate) allows the equaliser to determine whether a change to the channel estimate is likely to be adequately beneficial or whether the parameters of a current estimate can still be employed for equalising new received data. Preferably the equaliser only updates the channel estimate if there is a significant difference between the new estimate and the old. For example if there is no significant difference the additional power consumption involved in updating the channel estimate or, more particularly, look-up coefficients (as described in more detail below), may not be justified. As previously mentioned, in some embodiments previous erroneous data may be re-equalised when an updated channel estimate is calculated.

Further time and power savings may be achieved by the use of a look-up table storing pre-calculated received signal estimates, that is symbol sequences to which the channel estimate has been applied. Advantageously these estimated symbol sequences are distributed to a plurality of error metric calculating modules to allow parallel processing of the received signal, to facilitate comparison of the received signal with a plurality of estimated symbol sequences in parallel. This further reduces the number of computations required in a receiver and in embodiments provides multiple and/or faster equalisation. When using multiple receive antennas, for example, a single MLSE equaliser with a look-up table storing pre-determined values of branch metrics can be used with parallel modules for error calculation, instead of needing separate MLSE equalisers for each antenna. Alternatively with a single antenna receiver faster equalisation can be achieved as more estimated signals can be analysed in the same time.

In some embodiments the equaliser may be configured to disregard parameters of the channel estimate of less than a threshold significance. The magnitude of all the estimated channel components may be calculated and those having values less than a given percentage, for example 10% of the strongest component are discarded, for example by setting them to an easily identifiable value such as zero. The system can then avoid calculating a received signal estimate for that component or channel tap. In this way a simplified set of coefficients may be employed, so increasing the efficiency of the calculation.

The threshold for discarding or disregarding channel components may be varied according to power saving requirements of the equaliser/receiver For example if there is a high power saving requirement the threshold may be set higher than for a lower power saving requirement, thus reducing the number of channel estimations and/or calculations of expected data needed during packet processing. However the threshold is preferably not set so high that significant multipath components are disregarded since this can decrease the performance of the equaliser.

According to a related aspect of the invention there is provided a method of equalising data in a digital communication system, the method comprising: receiving data for equalisation; equalising said received data; error-checking said equalised data; determining a channel estimate using said received data and said error-checked equalised data; and updating a channel estimate for use in said equalisation using said determined channel estimate.

This method provides similar benefits and advantages to the above-described apparatus. The received data is preferably equalised by sequence estimation, for example using a Viterbi algorithm as described in G. David Forney, Jr. "The Viterbi Algorithm", Proceedings IEEE vol. 61 (3), March 1973, pages 267-278 and "Maximum-Likelihood Sequence Estimation of Digital Sequences in the Presence of Intersymbol Interference", IEEE Transactions on Information Theory vol. IT-18, no. 3, May 1972, pages 363-378.

In a related aspect the invention provides a method of MLSE type data equalisation in a digital communication system, the method comprising receiving data for equalisation; selecting a first estimated sequence for a portion of the received data from a plurality of hypothesised symbol sequences according to a metric for determining the closeness of a hypothesised sequence to the portion of received data; performing an error check procedure on the selected symbol sequence; and selecting a second estimated symbol sequence in response to said error check determining that said first sequence is erroneous.

This method again assists in tracking variations in the channel response, and embodiments of the method are quicker than making a trial or tentative decision based upon recently received symbols. The method allows a decision to be made rapidly and with a high degree of accuracy, but without the need for great complexity.

The metric used for evaluating a hypothesised sequence is preferably based on a determination of a mean square error and may comprise, for example, a Euclidean-type metric or an Ungerboeck-type metric, such metrics being well-known to those skilled in the art. Preferably the first sequence is that determined to be the closest to the received data and the second sequence the next closest.

In a further aspect the invention provides an equaliser for a digital communications system, the equaliser comprising a channel estimator configured to derive and store a channel estimate from data received by the equaliser; a control unit coupled to said channel estimator to update the stored channel estimate conditionally upon a change in said channel estimate of greater than a threshold level.

Preferably the channel estimate is stored in a look-up table as data for a plurality of symbol sequences to which the channel estimate has been applied. This is a computationally-efficient way of storing the channel estimation data since values required for MLSE equalisation are pre-computed. However pre-computing these values places a load on the resources of the equaliser and it is therefore beneficial to track changes in the channel estimate and only update the table when the channel estimate has changed by more than a re-computation trigger threshold.

The invention also provides a related method of equalising data in a digital communications system, the method comprising receiving data for equalisation; determining a channel estimate using said received data; determining whether said channel estimate is significantly different from a previously used channel estimate; storing said channel estimate conditionally upon said difference determining, and equalising said received data using said stored data.

In a further aspect the invention provides an equaliser for a digital communications system, the equaliser comprising a channel estimator configured to derive a channel estimate from data received by the equaliser; a look-up table configured to store data relating to said channel estimate as data for a plurality of symbol sequences to which said channel estimate has been applied; a plurality of metric determining modules each coupled to said look-up table, for determining a plurality of metrics in parallel, each metric for evaluating one of said symbol sequences against said received data; and a controller to output a selected one of said symbol sequences.

Employing a plurality of (error) metric determining modules each coupled to the look-up table permits faster equalisation and/or equalisation of multiple data streams where a common channel estimate can validly be employed, for example when using a receiver with multiple antennas. The controller is preferably configured to control the provision of data from the look-up table to the metric determining modules, and may comprise a comparator to select a sequence whose error metric (for example, Euclidean or Ungerboeck) is least.

The skilled person will recognise that the above-described equalisers and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. Similarly the code may comprise code for a hardware description language such as Verilog (Trade Mark) or VHDL (Very high speed integrated circuit Hardware Description Language). As the skilled person will appreciate, the code may be distributed between a plurality of coupled components in communication with one another.

BRIEF DESCRIPTION OF THE DRAWINGS

These and other aspects of the invention will now be further described, by way of example only, with reference to the accompanying figures in which.

DETAILED DESCRIPTION

For convenience embodiments of the invention will be described with reference to High Rate Bluetooth but applications of the invention are not limited to this system.

Figure 1A:
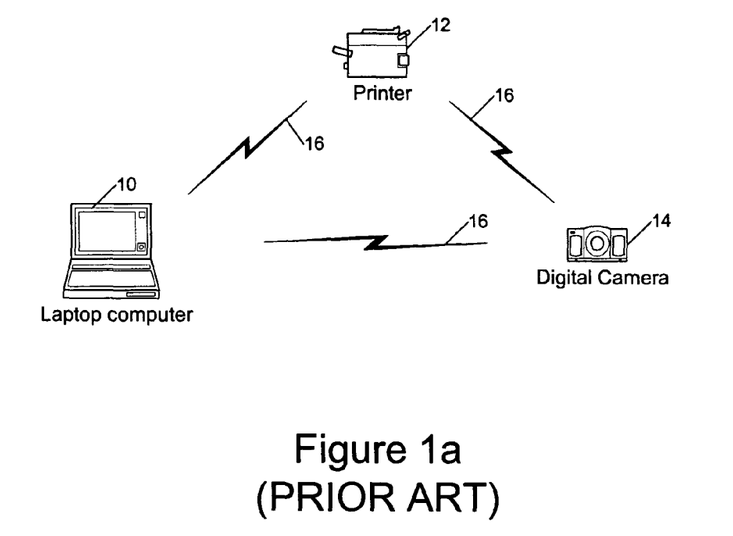
FIGS. 1a through 1d show, respectively, an exemplary Bluetooth application, an outline block diagram of a Bluetooth receiver, the structure of an unmodulated and unencoded high-rate Bluetooth packet, and a Bluetooth packet segment.

FIG. 1a shows the Bluetooth concept in which a computer 10, printer 12, and camera 14 are all in communication with one another by means of bi-directional Bluetooth radio links 16. Bluetooth can also be used for wireless connections to high speed voice/data access points.

Figure 1B:
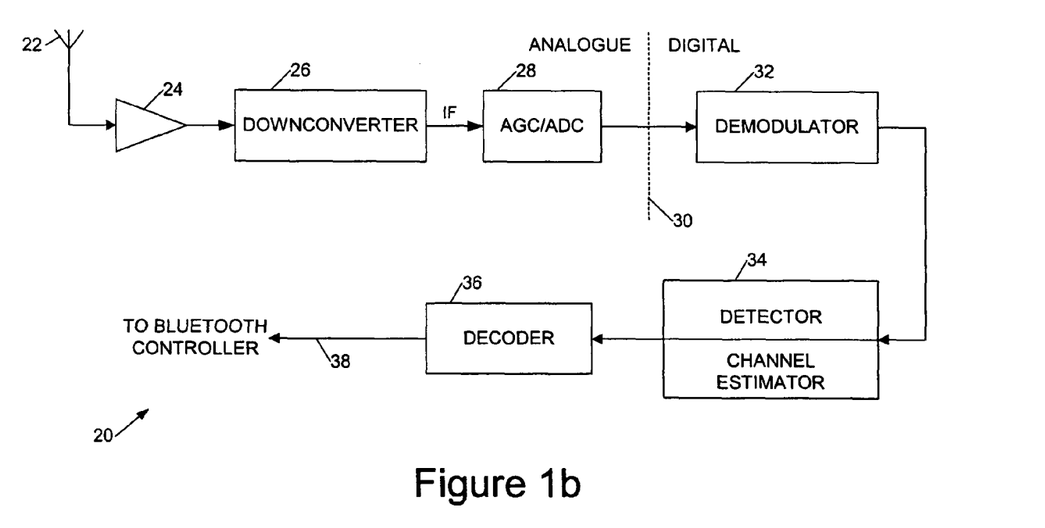

FIG. 1b shows an outline block diagram of Bluetooth receiver 20. The Bluetooth receiver 20 is typically part of a Bluetooth transceiver and a transmitter and transmit/receive switch (not shown in FIG. 1b) are generally also coupled to antenna 22 to allow both transmission and reception of data. The receiver comprises an antenna 22 coupled to a pre-amplifier 24 and a downconverter 26 providing an IF (Intermediate Frequency) or alternatively baseband output to an AGC (Automatic Gain Control) and analogue-to-digital conversion (ADC) block 28 providing digital I and Q (in phase and quadrature) signals. Further processing, optionally including downconversion to baseband, then takes place in the digital domain, to the right of dashed line 30, the output from ADC 28 being provided to a digital demodulator 32 (although analogue demodulation may also be employed). Further baseband processing comprises a channel estimator and detection 34 and a decoder 36. Decoder 36 decodes source and/or channel coding and provides a baseband output 38 for further processing by a Bluetooth controller (not shown).

In more detail, the baseband processing typically comprises synchronisation means for synchronising to received data symbols (which may be sampled at less than the symbol interval), an equaliser such as a decision feedback equaliser (DFE), including a channel estimator, and an error-checker/corrector. In a preferred implementaion the equaliser is based on sequence estimation, for example using MLSE, determining and evaluating path metrics as described in more detail later. The equaliser may use a Viterbi sequence estimation algorithm as described in G. Forney, Jr. "The Viterbi Algorithm", proceedings of the IEEE vol. 61 (3), March 1973, pages 267-278. Demodulator 32 may also include a rake or other coherent multipath combiner.

Figure 1C:
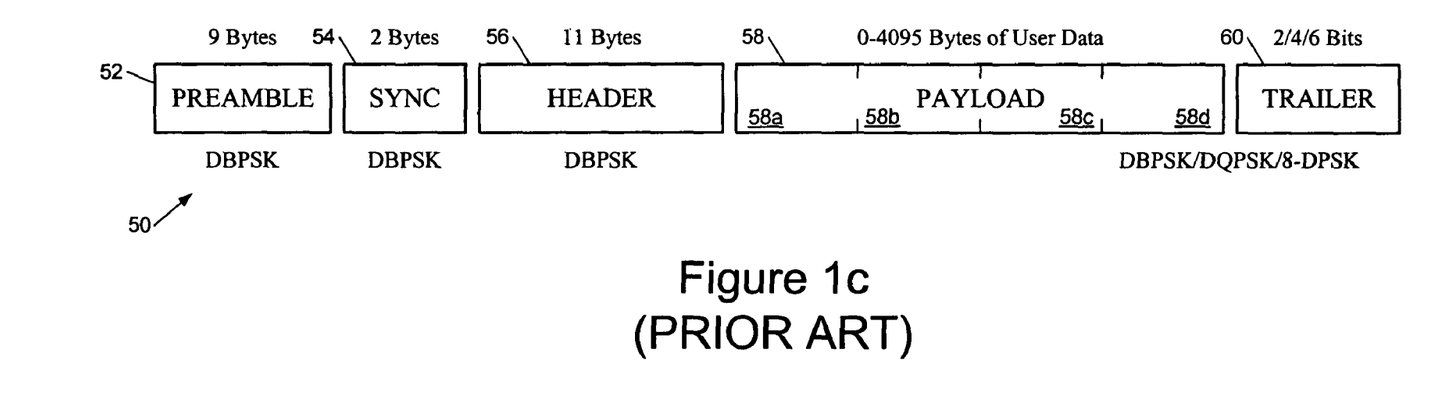

FIG. 1c shows the general format of a high-rate Bluetooth data packet 50. The packet has five fields, a 9 byte preamble field 52 a 2 byte synchronisation word 54, and 11 byte header 56, a payload 58 comprising up to 4095 bytes of user data, and a trailer field 60 of either 2, 4 or 6 bits. The header field 56 contains all the address information for the packet and some additional control information. The payload 58 comprises user information and when the payload is sufficiently large it may be sub-divided into segments 58a-d.

All the segments and the header have Cyclic Redundancy Codes (CRCs) for error-detection. The preamble 52, sync word 54 and header 56 are all modulated using DBPSK (Differential Binary Phase Shift Keying); the modulation format of the payload is indicated in the header and is one of DBPSK, DQPSK (Differential Quadrature Phase Shift Keying), (which apply, respectively, rotations of $\pi/2$ and $\pi/4$ when a new symbol is transmitted) and 8-DPSK. The trailer is modulated in the same format as the payload and, in the absence of a payload, the trailer is modulated in the same format as the header, that is DBPSK. The preamble 52, sync 54, header 56 and payload 58 fields are described in more detail below.

The preamble 52 comprises a 72-bit sequence obtained by repeating the 8-bit sequence: 0 0 0 0 1 1 1 1, nine times. The preamble is intended for use in supporting antenna diversity and AGC (Automatic Gain Control) training.

The sync word 54 comprises a 16-bit sequence, used for frame synchronisation, having a high auto-correlation coefficient. The sequence is: 0 0 0 0 0 0 1 0 0 1 1 1 0 1 0 1.

The header field 56 contains address and control information and has its own 24-bit CRC, the total length of the header including the CRC being 88 bits. The header fields, their size in bits, and their meaning is given in Table 1 below:

TABLE 1

| Field | Size | Meaning |
| --- | --- | --- |
| HR_ID | 8 | High Rate channel ID |
| DP_ADDR | 8 | Destination Point Address |
| SP_ADDR | 8 | Source Point Address |
| MOD_TYPE | 2 | Modulation Type |
| XTD_HDR | 2 | Extended Header |
| P_L | 12 | Payload Length in Bytes |
| FEC_ON | 1 | Forward Error Correction |
| Reserved | 1 | For future use |
| Flow | 1 | Flow Control |
| PKT_SAR | 2 | Packet Segmentation and Re-assembly |
| PLD_MN | 1 | Payload Message Number |
| ARQ_MN | 1 | Arq Message Number |
| ACK_REQ | 1 | Request Acknowledgement |
| RN | 8 | Request Number |
| SN_BM | 8 | Segment Error Bitmap |
| H_CRC | 24 | Header CRC |

Field HR_ID (8 bits) is a high-rate channel identification field used to distinguish between transmissions of different high-rate networks occupying the high-rate rf channel. Since a transceiver can only belong to only one high-rate network it will only accept packets that have the same fixed HR_ID. A Bluetooth device may comprise several transceivers each associated with a different HR link.

The DP_ADDR field (8 bits) defines a destination point address. Each device participating in a Bluetooth high-rate link may have a number of "logical points". One Bluetooth high-rate device may send information to a specific "logical point" on another device via the basic physical medium. The DP_ADDR field in the packet header indicates which logical point on the receiving device the packet is testing for. In general, a single high-rate unit will be assigned multiple logical point addresses. The high-rate units are therefore able to accept the received packets intended for multiple destination point addresses.

The H_CRC field (24 bits) is the header CRC, a cyclic redundancy check for detecting errors in the header.

Referring now to the payload field 58, the amount of user payload data that can be transmitted in a single packet is between 0 and 4095 bytes. If the amount of data to be transmitted within the packet is greater than 128 bytes then the data is split into one or more segments which are transmitted sequentially within the payload section of the packet 50.

Figure 1D:
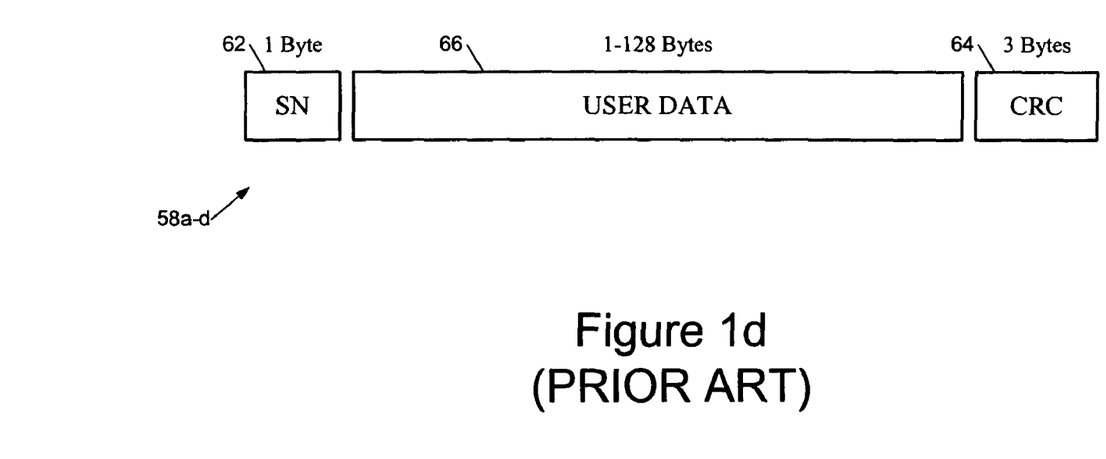

FIG. 1d shows the format of a Bluetooth packet segment such as one of segments 58a-d. Each segment is numbered with 1 byte (8-bit) sequence number SN 62 and has a 3 byte (24-bit) CRC64 to detect errors. The sequence number 62 and CRC 64 sandwich a user data field 66 containing 128 bytes (1024 bits) per segment. The last segment of the payload 58, in the illustrated example segment 58d, may be partially filled with user information, that is may hold between 1 and 128 bytes.

It is helpful at this point to review the operation of maximum likelihood sequence estimation (MLSE) equalisation.

Figure 2:
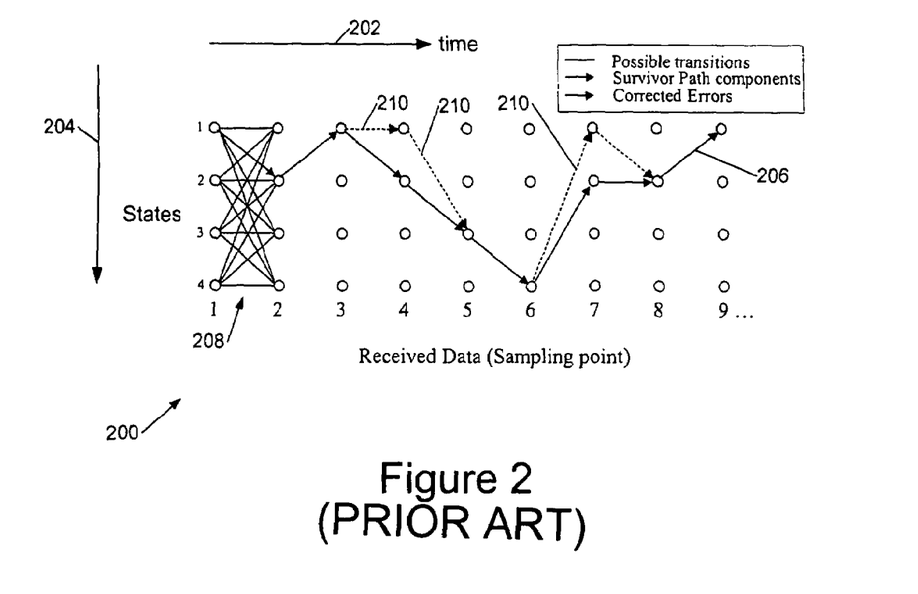
FIG. 2 shows an exemplary MLSE trellis diagram.

Consider a transmitter comprising a state machine which produces a sequence of outputs $d=\{d_1, d_2, \ldots d_k\}$ where each $d_i$ represents a transmitted symbol. It is possible to represent all the possible values of d at any given time k (in units of a symbol period) by a vertical vector, where each point in the vector is referred to as a state. FIG. 2 shows an MLSE trellis diagram 200 illustrating this.

Referring to FIG. 2, time in units of a symbol period runs along horizontal axis 202 and possible states of a received symbol are identified by points on vertical axis 204. In the illustrated example there are four possible states (one of four symbols) in each symbol period.

When the transmitted data is received, it is corrupted with noise, characterised in this example as Additive White Gaussian Noise (AWGN), n(t). Thus the received signal is given by:

$$r(t)=d(t)h(t)+n(t)$$

where d(t)h(t) comprises a convolution of the transmitted symbols with the response h(t) of a channel between the transmitter and the receiver.

If the transmission bandwidth is much greater than the coherence bandwidth (the bandwidth over which the channel frequency response stays relatively flat) then the channel varies significantly over the bandwidth of the transmission. Such a so-called frequency-selective fading channel increases the probability of error, due to previous symbols interfering with the symbol that is currently being estimated. This is called Inter-Symbol Interference (ISI) and produces a received signal r(t) given by the sum of the generated symbols d convolved with the channel components h according to the span of the channel q at time t, as shown in equation (1) below.

$$r(t) = \sum_q d_{(t-q+1)} h(q) + n(t) \qquad \text{Equation (1)}$$

Here the "span" q of the channel is the length of the overall channel impulse response measured in symbol periods or, in terms of time, (q−1)T where T is a symbol period.

For mitigating the ISI effects of ISI an equaliser can be used to correct the multipath distortion. Maximum Likelihood Sequence Estimation (MLSE) equalisers attempt to make a decision on an entire sequence of symbols, providing that perfect or reasonably accurate knowledge of the channel impulse response is available at the receiver. Once this information is available at the receiver, all possible combinations of the transmit sequence can be assessed and the process of detection of symbols performed.

In more detail, all possible received sequences are calculated at the receiver and convolved with the channel estimation. The output of this convolution process is then compared with the actual observation and the error between the received signal and all the possible sequences is found. The combination of expected data presenting the smallest error with respect to the received sampled signal under analysis is stored, becoming part of the only so-called "survivor path" for this node or state.

This process continues for a predetermined number of states or, alternatively, until a complete packet of information has been received. At the end of the process the sequence presenting the smallest error is termed the survivor path, path 206 in FIG. 2, and the sequence of states defined by this path is taken as the best estimate of the transmitted data, and thus becomes the decoded received data. The predetermined length or "truncation depth" after which a decision is made can be taken to be when the survivor paths for all possible states converge. This is generally taken to be a multiple of the channel span, such as between five and ten times the span.

As shown in FIG. 2, this MLSE equalisation technique can be graphically represented as a so-called trellis diagram. FIG. 2 shows a trellis diagram for the case of QPSK (Quadrature Phase Shift Keying) modulation, in which each received symbol has four possible states. These states are mapped into a vertical vector or column, with each successive column representing subsequent sampling points in time. In FIG. 2 column 1 corresponds to the oldest sampled symbol and column 9 is the most recently sampled symbol. Survivor path 206 is the survivor path for state 1 of column 1 after reception of nine consecutive symbols. For clarity survivor paths for final states 2, 3, and 4 (that is after reception of nine consecutive symbols) are not depicted in FIG. 2.

The set of lines 208 represents all the possible transitions between states or modes of columns 1 and 2; dashed lines 210 show symbols that were corrected after more information was received at the receiver. Thus, for example, at sampling point 4 the path leading to state 1 had the smallest error although its error value was similar to that of the path leading to state 2. On receipt of further information that is on receipt of the symbol for sampling point 5, the path was corrected to lead to state 2 at sampling point 4. This can be understood because in the presence of inter-symbol interference a received symbol carries information relating to previously received symbols.

Figure 3:
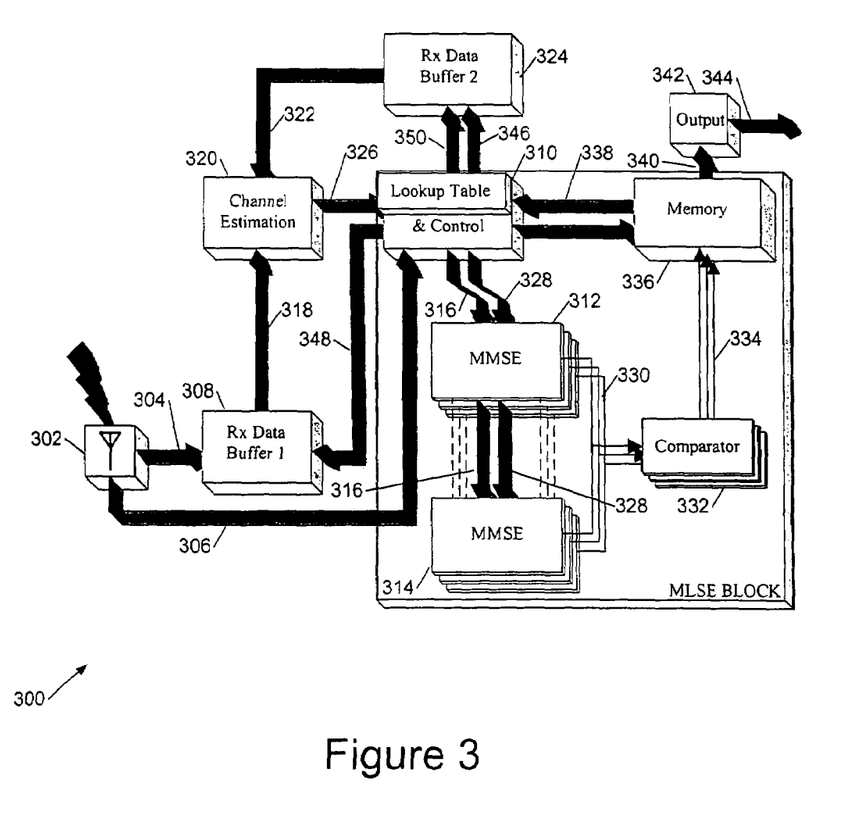
FIG. 3 shows an embodiment of an MLSE Viterbi equaliser according to the present invention.

Referring next to FIG. 3, this shows a receiver 300 incorporating an MLSE Viterbi equaliser according to the present invention.

An rf front end indicated by antenna 302 receives an rf data signal and outputs a digitised version of the received rf data on received data buses 304 and 306, respectively coupled to a first received data buffer 308 and to a look-up table and control module 310. The look-up table and control module 310 forwards the received data to two Minimum Mean-Square Error (MMSE) modules 312, 314 on a further received databus 316. The digital data provided on buses 304, 306 and 316 may comprise one or more multi-bit samples per symbol.

The illustrated embodiment of the equaliser has two MMSE modules but other embodiments may have more than two such modules or just a single MMSE module. Each of MMSE modules 312, 314 is illustrated in FIG. 3 as a set of MMSE modules since, in operation, a plurality of MMSE operations is generally performed, for example on a time-multiplexed basis, when estimating a received data sequence. The MMSE process is configured to determine the errors between the estimated signals and the received signal, the combination of symbols presenting the smallest error with respect to the incoming signal being the one to be selected. Broadly speaking the MMSE modules allow parallel calculation of these errors, in embodiments in a time multiplexed system in which the operations are performed one at a time (although in other embodiments a higher degree of parallelism may be employed).

The first received data buffer 308 provides an output 318 to a channel estimation module 320. Output 318 comprises non-equalised received data which can be compared with known data such as a training sequence or confirmed received data to determine an estimate for the received channel. The first received data buffer 308 stores the received data on a periodic basis. Once these data have been decoded and verified as correct, for example by a CRC, the data stored in buffer 308 can be considered as confirmed because it corresponds to reliable decoded data. This allows the transference of information from buffer 308 to channel estimation module 320 to be performed only when the decoded information (which may include data previously stored in buffer 308) is known to be correct.

A second input to channel estimation module 320 is provided by an output 322 from a second received data buffer 324. The second received data buffer 324 stores equalised data and provides confirmed received data on output 322, that is data for which a cyclic redundancy check (CRC) or other error checking and/or correction has been successful. Channel estimation module 320 has an output 326 comprising a (complex) channel estimate derived from the received data. This channel estimate may be in the form of a plurality of channel components h(q) as described above. The channel estimate output 326 is provided to the look-up table and control module 310 for use in calculating entries in the look-up table when the channel estimate changes.

The look-up table of the look-up table and control module 310 stores a set of estimated symbol sequences obtained by convolving possible received sequences, preferably all possible received sequences for a desired truncation depth, with an estimate for the channel as determined by channel estimation module 320. This estimated symbol sequence data is provided on output 328 to MMSE modules 312, 314 for comparison with actual received data to determine the difference between the received signal data and the set of estimated symbol sequences to determine the best match.

For example, for a binary system comprising two symbols (−1 and 1) under the effect of ISI in a channel composed of two taps (a and b) the look-up table would appear as show in Table 2 below. In the look-up table, all the possible received sequences are stored as well as the value resulting from their convolution with the channel components.

TABLE 2

| Oldest symbol component (channel component b) | Newest symbol component (channel component a) | Expected Value (without noise) |
|---|---|---|
| 1 | 1 | 1 * b + 1 * a |
| −1 | 1 | −1 * b + 1 * a |
| 1 | −1 | 1 * b + −1 * a |
| −1 | −1 | −1 * b + −1 * a |

Here the values on the first and second columns are the expected received symbols and the combined values in column three are the results from the convolution of the channel components with the expected symbols. The values in column three are the ones to be compared against the received data at a given period of time (as previously stated, the expected value presenting the smallest error with respect to the received data is the one to be chosen, and the corresponding symbols associated with it are taken as decoded data).

Each MMSE module 312, 314 provides an estimated error output 330 comprising estimated error data relating to the difference between the received data and the estimated symbol sequence or sequences the MMSE has processed. This data is provided to a comparator 332 which compares the estimated error data for the estimated symbol sequences to determine the best match to the received data, and provides an output 334. Output 334 may either comprise the best match estimated sequence or information identifying this sequence; where output 334 comprises the best match sequence, this may be obtained from the data provided to MMSE modules 312, 314 on output 316 of look-up table and control module 310 by including in output 310 sequence data which has not been convolved with the channel estimate. A memory 336 stores the best match estimated symbol sequence for the tranche of received data processed by the equaliser. The data to be stored in the memory module 336 are the symbols contained the look-up table relating to the expected value that gave the smallest error after MMSE calculation, and the value corresponding to the accumulated error for every path.

In the illustrated embodiment the best estimate of the symbol sequence is written into memory 336 from comparator 332 and then provided to the look-up table and control module 310 on memory output 338. A second output 340 from memory 336 provides equalised, decoded data to an output drive module 342 which in turn provides an output 344 comprising baseband data for further processing as required. Memory module 336 may store the decoded received data as symbols but preferably the data is stored as demodulated baseband data. Error-checking such as CRC checking may be performed by look-up table and control module 310 but is preferably performed by memory module 336. Thus the data stored in memory 336 preferably also includes the results of such error-checking and optionally, where implemented, error correction.

A portion of the decoded received data stored in memory 336 is provided to the second received data buffer 324 via input 338 to look-up table and control module 310 and an output 346 from the control module 310 to the second data buffer 324. In this way received and decoded data which has been confirmed correct by an error-checking procedure can be made available to channel estimation module 320 for determination of a channel estimate based upon received and decoded payload data, that is upon variable data, rather than upon, for example, a dedicated training sequence or other fixed data within a received data packet. In some embodiments error-checking may be carried out in the second received data buffer 324 additionally or alternatively to being carried out elsewhere.

The look-up table and control module 310 controls the operation of the equaliser as described in more detail below. In particular module 310 controls the first and second received data buffers 308, 324 by means of respective control outputs 348 and 350, and controls memory module 336 by means of control bus 352.

The skilled person will appreciate that although the receiver and equaliser of FIG. 3 is, for convenience, drawn in block diagram form in practice the equaliser may be implemented in software, for example on a digital signal processor, or may be specified in software by a design engineer using, for example, a hardware description language such as VHDL, the precise hardware implementation then being determined by the hardware description language compiler.

The structure illustrated in FIG. 3, and in particular look-up table and control module (LUTC) 310, improves upon conventional MLSE Viterbi equalisers by facilitating updates of channel estimates using packet payload data as a training sequence for the channel estimator when the received information has been confirmed by an error-detecting procedure such as a CRC. Furthermore the structure facilitates the calculation of a plurality of error metrics in parallel, to compare actual received and estimated expected data. In particular the look-up table and control module 310 facilitates the distribution of data to a plurality of minimum mean-square error or other error metric-determining modules.

The functions of the elements of the receiver 300 of FIG. 3 will next be described in greater detail.

The first and second data buffer modules 308, 324 store related received and decoded data respectively for use in channel estimation. For information in payload 58 of data packet 50 the reliability of the stored information may be confirmed by calculating a CRC for every segment 58$a$-$d$ in the received packet. Data is stored in data buffers 308 and 324 so that un-equalised received data in first buffer 308 can be matched with equalised data in second buffer 324 so that a channel estimate can be made. Since the equalised data or buffer 324 is only available later than the raw received data, the LUTC module 310 controls buffers 308 and 324 by means of control buses 348 and 350 respectively so that corresponding data is stored in each buffer.

The channel estimation module 320 calculates estimates for channel coefficients for use by the look-up table and control module 310.

An initial channel estimate is determined at the start of a received data packet, for example using a training sequence or other known data. Further channel estimates may then be determined either periodically or on demand according to the quality of the demodulated signal. In a preferred embodiment the initial information used for channel estimation comprises a training sequence known at the receiver and subsequent estimates are determined during packet transmission using data read from the second received data buffer 324.

Once sufficient data has been stored in the first data buffer 308 channel estimate information may be obtained using any one of a number of conventional methods which will be well-known to the skilled person, such as a Recursive Least-Square (RLS) or Least Mean-Square (LMS) method or a variant thereof, as described, for example, in John G. Proakis, "Digital Communications", Mc Graw Hill, Fourth edition 2001 Chapter Ten: Communications through Band-Limited Linear Filter Channels, hereby incorporated by reference. Particularly advantageous forms of channel estimation are described in the applicant's co-pending UK patent application entitled Channel Estimation Apparatus and Methods filed on the same day as this application.

It will be appreciated that information from the received data buffers is preferably only used for generating a channel estimate if an error check for the data has been successful (although an estimate could be generated but not used if an error check/detect indicated the presence of one or more errors).

The Minimum Mean-Square Error (MMSE) modules 312, 314 each compare the received data against data loaded from the look-up table of LUTC module 310 comprising a data sequence to which the channel estimate has been applied. Each MMSE module returns data indicating the error or distance between the sequence data from the look-up table and the received sequence data, according to any conventional algorithm such as, for example, a Minimum Mean Squares algorithm as described, for example, in Todd K. Moon and Wynn C. Stirling, "Mathematical Methods and Algorithms for Signal Processing", Prentice Hall, 2000, pages 105-107, hereby incorporated by reference.

As can be seen from FIG. 3, two or more MMSE modules may be implemented in parallel in order to speed up the calculation process in the receiver/equaliser. The comparator module 322 analyses error values received from the MMSE modules 312, 314 and picks the symbol sequence with the smallest error for adding a symbol to the survivor path stored in memory 336 and for updating the accumulated error for the path being decoded.

Symbols are stored in memory but they are subject to modifications, for instance when after calculating the accumulated error the resulting value shows that different previous symbol or symbols values add less error. Output 334 transports information referring or relating to the smallest error and its value. This information is then processed in memory, the best path (that is, the path with the smallest error) for every state is stored and the accumulated error for the path updated. The newest set of symbols (with a length equal to the channel span) is provisionally stored as the decoded symbols are subject to future received data. Symbols are definitively stored and confirmed as soon as all the received signals containing information about them have been received.

Memory module 336 stores the most likely paths and makes them available to other modules. The distribution of data in memory module 336 preferably follows a sliding window approach, in which the last state in the trellis path is transferred to the output and removed from the memory. After this process the data packets (or a pointer to the data) stored in the memory is shifted and a new symbol is written into the memory.

In a preferred embodiment an error check such as a CRC check is carried out as soon as a segment of payload data has been received completely. Then, to save memory, data can be removed from the memory and transferred to the output (and to the second received data buffer 324) when the error check establishes that the received data is correct.

Further memory savings may be achieved in cases such as occur from time to time when the paths share the same route and last longer than the channel span (see, for example FIG. 4a described later, where the paths converge at the left hand side of the trellis). This additional memory saving is particularly useful in embodiments which permit portions of memory 336 to be dynamically allocated to different processes.

The look-up table and control (LUTC) module 310 performs a number of functions. The module controls the first and second received data buffers 308 and 324 to capture the equalised data (in symbols) that correspond to the received (complex number) data values prior to equalisation, by means of controlled buses 348 and 350 respectively. LUTC modules 310 also controls these received data buffers to provide data from each to the channel estimation module 320. In this way data from the two data buffers can be arranged so that corresponding equalisation and un-equalised data is available to the channel estimation module despite these two sets of data being available at different times and points in the system.

The LUTC module 310 is also configured to collect the received data from rf front end 302 and to distribute this data across the MMSE modules 312, 314, together with data from the look-up table which has previously been estimated in the receiver.

The LUTC module 310 is further configured to store data for initialising a new trellis, that is training sequence data and what can be termed "follow-on" data, as described in more detail below. This is aimed at reducing the calculation load of the equaliser by providing better information about the received data corresponding to the first symbol entering the trellis.

The LUTC module preferably also stops the equalisation process of subsequent information if the header (or training sequence) has been received in error and recovery has not been possible. In some instances recovery of information in the header is possible by analysing the different survivor paths for the received data.

In embodiments of the system, the user's information is divided into segments. The payload is always preceded by a header that provides information about the number of segments and other control options and the header, like the segments, has CRC error detection. Consider the case when the whole header has been received and CRC checking of the path presenting the smallest error has failed. Under these circumstances an attempt to recover the information performed by CRC checking all the different survivor paths contained in memory at that time. However, if the CRC check fails for all of them, considering that the header contains vital information for the packet being received, then preferably the whole packet is discarded.

The LUTC 310 also compares the channel estimate in use with newly calculated channel estimate coefficients from channel estimation module 320 (presently used coefficients being stored in module 310) to determine whether the channel estimate has changed sufficiently to justify recalculating the values stored in the look-up table. The LUTC module 310 updates the information stored in the look-up table to use a newly calculated channel estimate when the difference between the values of coefficients in use and the values of more recently determined coefficients is above a threshold level (according to parameters defined at the receiver). Since the process of equalisation is preferably carried out continuously (that is continuously, periodically) the convolution of new channel estimates with the expected received data can be loaded and used by the MMSE modules 312, 314 as soon as these modules are ready to accept it. This helps in decreasing the probability of error and in maintaining a constant truncation depth.

As the channel components are represented by complex numbers, the changes between old channel estimates and the new ones can be based on a direct comparison of the magnitude and/or phase of the corresponding old and new channel components or taps to be updated. This works particularly well where the channel remains substantially constant or presents only small variations from estimation to estimation during transmission. In embodiments, the only history or information from previous channel components considered is the information from the last or most recent estimation, earlier channels values being discarded. The calculation of the difference between channel estimates can be performed by the MMSE modules 312, 314. The comparison of channel estimates may be performed immediately after new channel estimates are available. The threshold for updating the channel can be determined, for example, according to the sensitivity of the application to erroneous data and/or power supply availability at the receiving device.

Figure 4A:
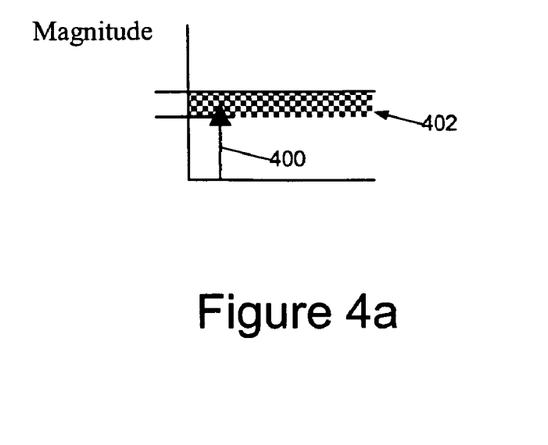
FIGS. 4a and 4b show diagrammatic representations of permitted variations in magnitude and phase angle respectively of a complex estimated transmission channel response coefficient.
Figure 4B:
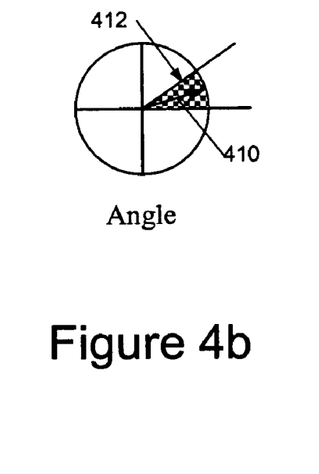

Referring now to FIGS. 4a and 4b, these show diagrammatic representations of permitted channel estimate variations in one embodiment of the system. Respective arrows 400, 410 show phase angle and magnitude for one of a plurality of complex previously determined received channel coefficients. Shaded regions 402, 412 define phase angle and magnitude values where new channel estimate can be received without further calculation of look-up table coefficients, for example +/−5% either side of a previous value. If a new channel estimate lies outside one or both of these regions, a new set of estimated data may be calculated.

For example, a complex channel tap can be represented by $Ae^{j\theta}$ where A is the magnitude and $\theta$ is the angle. Knowing this, a direct comparison of two different channel taps can be made. If a previous channel component is given by $A_1 e^{j\Theta_1}$ and a newly calculated one is $A_2 e^{\theta_2}$, from $A_1$ and according to the receiver requirements in terms of received errors and power scheme (given, for example, as a percentage of an allowed variation) the maximum and minimum values (or thresholds) for an expected $A_2$ can be calculated. A similar calculation can be made for $\theta_1$ and $\theta_2$. Once these values have been obtained, an MMSE can be computed and a decision taken.

In one embodiment of the system separate channel estimates are used for the header and for subsequent payload data segments. Thus a coarse channel estimate can be used for the header (calculated from the sync word) as the DBPSK modulation is relatively robust and, if necessary, a refined channel estimate can be calculated by LUTC 310 from the decision on the header data (providing the CRC is correct). This has the advantage of reducing the complexity and latency of performing channel estimation and calculating the look-up table, whilst providing more accurate channel state information.

In a preferred embodiment the LUTC 310 also analyses the magnitude of some, preferably, all, of the channel components in order to avoid the computation of non-significant values. For example, when a channel tap magnitude is smaller than a pre-determined or selected threshold it can be omitted from the look-up table (or set to 0), thus reducing the number of calculations performed by the equaliser, and consequently speeding up the signal processing.

Figure 5A:
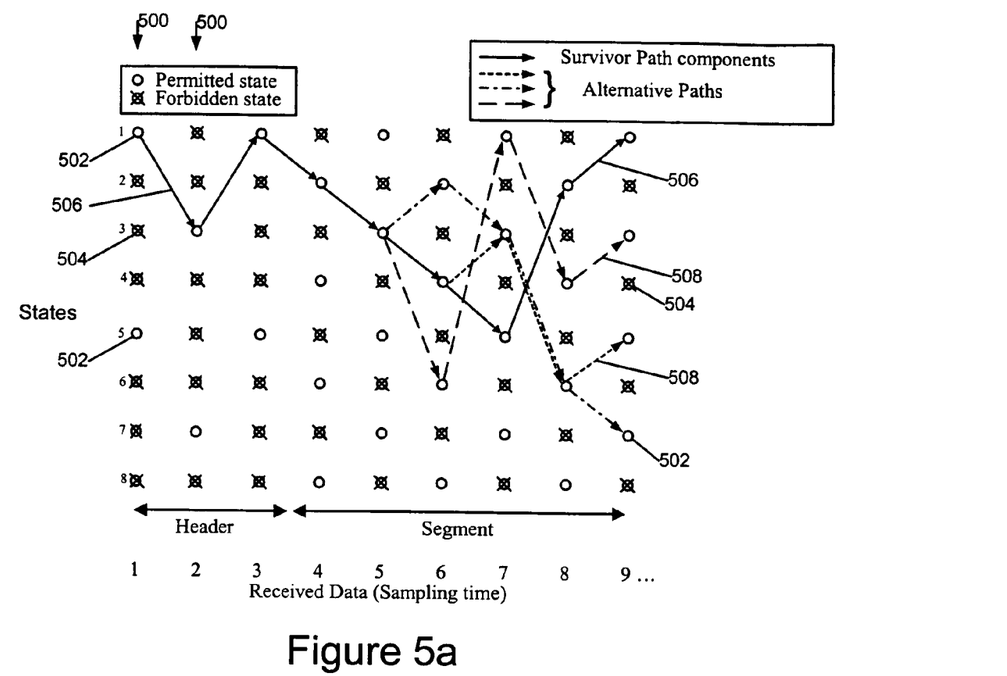
FIGS. 5a and 5b show trellis diagrams relating to detection of an entire data packet with a change in modulation from DBPSK to, respectively DQPSK and D-8PSK.
Figure 5B:
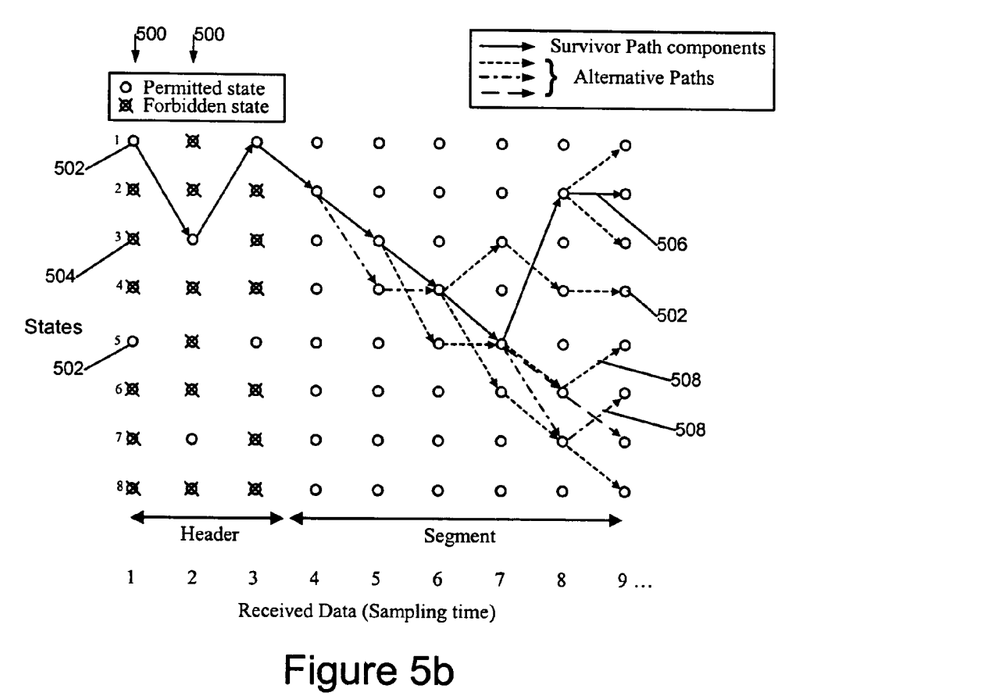

The operation of the receiver/equaliser 300 of FIG. 3 will now be described with reference to FIGS. 5*a* and 5*b*. It will be recalled from FIG. 1*c* that the modulation scheme of data packet 50 changes from DBPSK for the preamble 52, sync 54, and header fields 60 to one of DBPSK, DQPSK and 8-DPSK for payload 58. FIG. 5*a* shows a trellis diagram for continuous detection of an entire packet, as explained more fully below, in which the modulation changes from DBPSK to DQPSK. FIG. 5*b* shows a similar diagram in which the modulation changes from DBPSK to D-8PSK.

In both FIGS. 5*a* and 5*b* time in units of symbol period runs along the horizontal axis and at each instance of time the possible values of a received symbol are indicated by points on a vertical vector 500. For the initial 3 symbols (sampling times 1, 2 and 3) only two symbol values (values 1 and 5) are possible because of the binary modulation. Permitted states are indicated by open circles 502 and forbidden states are indicated by crossed circles 504. In FIG. 5*a* the quadrature modulation for received samples 4 to 9 allows only part the represented states to be used, but in FIG. 5*b* the 8-phase modulation allows the use of all 8 represented states each sampling time interval. Still referring to FIGS. 5*a* and 5*b*, components of the survivor path are indicated by solid lines 506 whilst alternative paths are indicated by dashed lines 508.

In the case of Bluetooth High Rate, the some or all of preamble field 52 (or part of this field), the sinc word 54 and a portion of the information from the start of the header field 56 may together be used as a training sequence. The known information at the start of the header field 56 may comprise, for example, HR_ID and, optionally, DP_ADDR which will also often be known. In other data communication systems, other known data and/or a dedicated training sequence may be employed. Preferably, equalisation of the header begins immediately after the training sequence has finished.

Independently of what data is used as the training sequence it is preferable to include the last q−1 symbols from the training sequence as part of the first symbol entering the new trellis. This helps to avoid the "edge effect" which would otherwise be caused by the discontinuity present in the trellis at its start point. The finish point for a trellis can by any point as long as the information referent to the last decoded symbol has been received completely (to avoid an edge effect). In other words, after receiving a given symbol it is desirable to receive subsequent samples (separated by a symbol period distance) that include information from the last decoded symbol (equivalent to the channel length-1).

There are two main options for decoding the packet structure shown in FIGS. 1*c* and 1*d*, one using a continuous trellis for continuous detection of the entire packet, the other using a separate trellis for the header and for each subsequent segment (although it will be recognised that intermediate options are also available). The LUTC module 310 may implement either or both of these options or variants thereof.

A method employing a trellis for substantially continuous detection of substantially an entire packet will be described first. Broadly speaking this method employs a single trellis for substantially the entire packet and requires an amount of memory determined by the length of the survivor paths and the number of possible states. In this case, the required storage memory is M*L for the decoded symbols, where M is the number of symbols and L is the number of received symbol samples, plus M for the accumulated path metrics. So, in total, the memory capacity should be (M*L)+M.

As can be seen by inspection of FIG. 4*a*, it is possible to make a decision on the value of a particular symbol as it reaches the end of the survivor path 406*a*. FIG. 4*a* shows the four possible path metrics for a particular (current) instant in time, symbol 9 at the right hand side of the trellis. There are four possible states as QPSK is used for modulation of the segment data. These four paths converge to the survivor path 406*a*, that is the path with the lowest path metric. Thus, if a decision is made at symbol 1, state 1 will be chosen as this has the lowest path metric.

If continuous detection is employed then there can be some overhead in the size of the trellis, as the modulation scheme used in the header may be different to that for subsequent segments. Thus, it possible to use an 8 state trellis distribution all the time, but constraining the number of states used for DBPSK and DQPSK. The equaliser can then be allowed to run through the trellis as normal except that transition to the other modulation states is not allowed. This is shown in FIG. 4*a* for the case of a DBPSK header and DQPSK segment, where only certain states in the trellis are permitted. When the payload is modulated using 8-DPSK, a corresponding transition between the header and payload modulation is mapped into the trellis, but in this case no rotation is applied so that only 8 states are necessary, as shown in FIG. 4*b*.

An alternative mode of operation uses segment-by-segment detection rather than "continuous" detection. In this latter mode separate trellis are used for detecting and evaluating the header and/or each subsequent data segment or set of data segments. In this mode of operation, a decision is made on the header or on a particular segment and then the trellis is re-initialised for the subsequent segment.

To make a decision on a particular segment (or on the header) the trellis may be run until the last symbol exceeds the delay required for the survivor paths to converge, as previously described. However, this introduces an additional latency and also involves spanning the header-segment boundary, as illustrated, for example in FIGS. 4a and 4b. A preferred alternative is therefore to make a trial decision of the last symbols of a segment immediately they are detected. This introduces a higher probability of error, as the survivor paths have not converged and for this reason a preferred embodiment of this mode of operation employs the procedure illustrated in FIG. 6.

Figure 6:
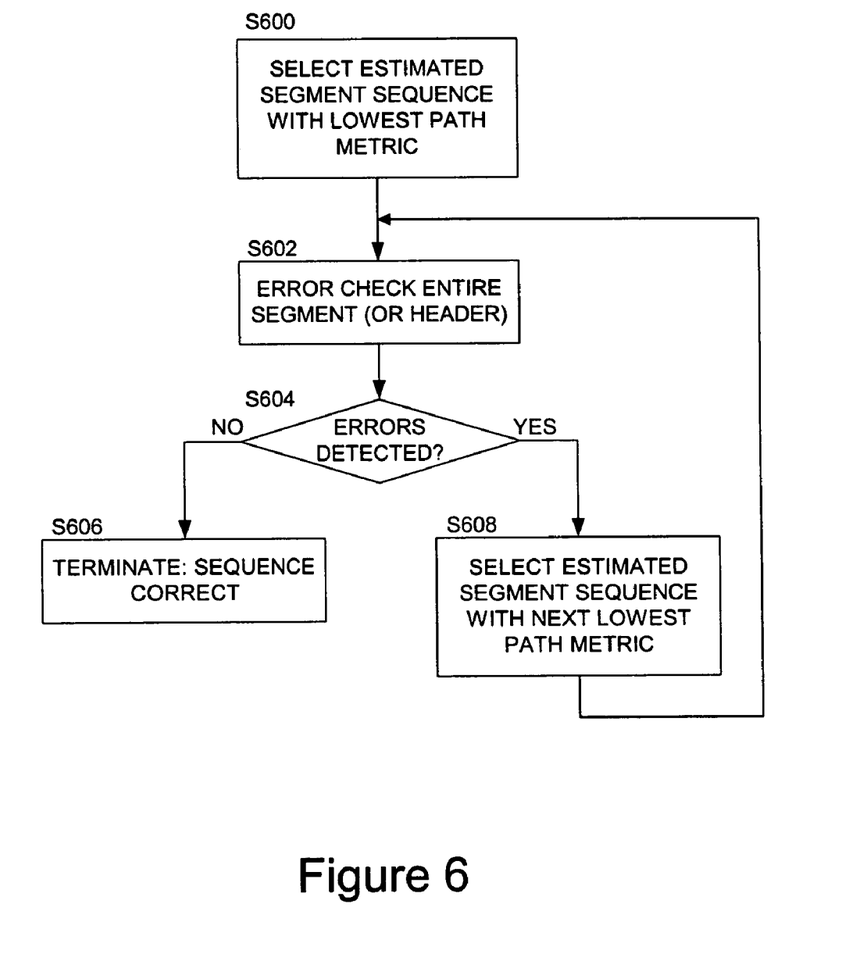
FIG. 6 shows a flow diagram of a segment-by-segment path detection process.

FIG. 6 shows a flow diagram of a procedure for selecting a survivor path for a series of received data, for example data of a segment of a Bluetooth packet.

At step S600 an estimated or hypothesised segment sequence is selected, this being a or the sequence with the lowest path metric. Preferably this includes the best estimate for the terminal part of this sequence, such as an estimate of the last symbols of a packet data segment. Then, at step S602, the entire received data series (segment or header) is error checked, in the case of a Bluetooth packet by performing a CRC check. At step S604 a decision is made based upon whether or not any errors were detected. If no errors were detected the procedure terminates at step S606 and the data series (segment or header) is presumed to be correct. If one or more errors were detected then, at step S608, an estimated or hypothesised sequence with the next lowest path metric is selected, and the procedure loops back to step S602 to again check to see whether this next closest sequence is correct. The procedure continues to loop until an error-free path is found or until all the paths have been CRC analysed. In practice, only the final few symbols are likely to change since the path is likely to have converged for earlier symbols. The procedure of FIG. 6 allows a decision to be made very quickly and with a high degree of accuracy, but without a great computational overhead.

For the High Rate Bluetooth packet structure it is important to consider the transition from header to the first segment, and between subsequent segments, as there is no guard period between them. To address this inconvenience, the last q–1 decoded states from the header (where q is the channel span) may be temporarily stored as a subset of the new trellis diagram to be used. If the previous data has been decoded correctly (i.e. the CRC has been passed) then it is possible to be certain of the survivor path at this point as the last q–1 symbols are known. These values can then be used to provide more deterministic information at the beginning of the new trellis. However, if the previous CRC is incorrect (or has not yet been decoded) the trellis may then be filled with n survivor paths, one for each of the n possible states, each comprising q–1 values and having an associated path metric.

In the case of the header-segment transition it is possible that the modulation scheme will also change. If the equalisation processing is performed separately on the header and the first segment then the header symbol is mapped onto the corresponding segment symbol before it is inserted in the new trellis, as previously described. For example, with a header modulated using BPSK and a segment modulated using QPSK a two state trellis can be used for the BPSK, and a four state trellis can be used for the segment.

Embodiments of the above described equalisation apparatus and methods provide a number of advantages. Firstly, they provide improved channel estimation as compared with prior art apparatus and methods and as the estimated channel coefficients are tracked on a periodic basis previously estimated coefficient values may be employed where appropriate and convergence to new channel coefficients may be accelerated. Channel estimation and the calculation of estimated sequences can be performed simultaneously with the equalisation process, reducing delays in the adoption of new channel estimates, whilst maintaining a substantially constant truncation depth. Furthermore, the MLSE equaliser may relatively simple for short range RF links such as wireless personal area networks (PAN) because of the reduced multi path spread and relatively low ISI. The described techniques also allow a reduction in the number of calculations where the magnitude of some of the channel packs is not sufficient to provide a significant improvement to the equalisation process. Parallel processing is also available in embodiments as the data to be analysed can be provided independently to aid plurality of processing modules by the look-up table and control module (LUTC) 310. Such embodiments are particularly suitable for implementation in hardware. Simultaneous equalisation of a newly received segment and a previously received segment that has failed an error check, such as a CRC, in some embodiments is possible almost as soon as a new or updated channel estimate is available.

Embodiments of the invention have been described with particular reference to short range RF data communication links such as High Rate Bluetooth, but applications to the invention are not limited to such scenarios. Thus, the equalisation techniques and methods described herein may be applied to other RF data communication systems such as Wireless LAN networks (for example IEEE 802.11), digital mobile phone communication systems, to infra-red based communication systems, and also to wired systems such as fibre optic communication systems.

No doubt many other effective alternatives will occur to the skilled person. It will be understood that the invention is not limited to the described embodiments and +encompasses modifications apparent to those skilled in the art lying within the spirit and scope of the claims appended hereto.

The invention claimed is:

1. An equaliser for a digital communications system, the equaliser comprising:
    a first buffer to store received data prior to equalisation;
    a second buffer to store error-checked received data;
    a channel estimator coupled to said first and second buffers to determine a channel estimate using said received data from said first buffer and said error-checked data from said second buffer; and
    a control unit coupled to said channel estimator to update the channel estimate for use by said equaliser in equalising said received data,
    wherein said control unit is configured to perform said updating conditional upon a difference between the channel estimate and a previous channel estimate used for equalising said received data; and
    a look-up table coupled to said control unit and a calculating device coupled to said look-up table and configured to calculate and store in said look-up table, data for a plurality of symbol sequences, the data for each symbol sequence comprising data obtained by applying said channel estimate to a sequence of symbols.

2. An equaliser as claimed in claim 1 further comprising a plurality of metric determining modules each coupled to said look-up table for determining in parallel, a plurality of metrics for comparing said received data and the data for said symbol sequences, whereby a symbol sequence for said received data may be selected.

3. An equaliser as claimed in claim 1 further configured to use said updated channel estimate to equalise previously received data determined to be erroneous.

4. An equaliser as claimed in claim 1 wherein said control unit is further configured to control the equaliser to disregard parameters of said channel estimate of less than a threshold significance.

5. An equaliser as claimed in claim 4 wherein said threshold significance is variable.

6. An equaliser as claimed in claim 1 wherein said error-checked data comprises error-corrected data.

7. An equaliser according to claim 1 of the Maximum Likelihood Sequence Estimation (MLSE) type.

8. A method of equalising data in a digital communication system, the method comprising:
   receiving said data for equalisation;
   storing said received data in a first buffer;
   equalising said received data;
   error-checking said equalised data;
   storing said error-checked data in a second buffer;
   reading data from said first and second buffers;
   determining a channel estimate using said received data and said error-checked equalised data; and
   updating said channel estimate for use in said equalisation using said determined channel estimate, wherein said updating is conditional upon said channel estimate being different from a channel estimate previously used for said equalising by more than an updating trigger level; and
   storing said channel estimate in a look-up table as data for a plurality of symbol sequences modified by said channel estimate.

9. A method as claimed in claim 8 further comprising:
   re-equalising previously received data following said updating.

10. A method as claimed in claim 8 further comprising:
    modifying said channel estimate to reduce a computational load of said equalising.

11. A method as claimed in claim 10 wherein said modifying comprises discarding parameters of said channel estimate of less than a threshold significance.

12. A method as claimed in claim 11 further comprising modifying said threshold significance, in particular in response to a desired power consumption.

13. A method as claimed in claim 8 further comprising:
    providing data from said look-up table to a plurality of metric determining modules for determining, in parallel, metrics for evaluating hypothesised symbol sequences against said received data, for estimating a symbol sequence of said received data.

14. A method as claimed in claim 8 wherein said equalising comprises Maximum Likelihood Sequence Estimation (MLSE) type equalising.

15. A computer readable medium encoded with program instructions which when executed by a computer results in equalising data in a digital communication system by performance of steps comprising:
    receiving said data for equalisation;
    storing said received data in a first buffer;
    equalising said received data;
    error-checking said equalised data;
    storing said error-checked data in a second buffer;
    reading data from said first and second buffers;
    determining a channel estimate using said received data and said error-checked equalised data;
    updating a channel estimate for use in said equalisation using said determined channel estimate, wherein said updating is conditional upon said channel estimate being different from a channel estimate previously used for said equalising by more than an updating trigger level; and
    storing said channel estimate in a look-up table as data for a plurality of symbol sequences modified by said channel estimate.

\* \* \* \* \*